United States Patent
Kono

(10) Patent No.: US 10,180,798 B2
(45) Date of Patent: Jan. 15, 2019

(54) METHOD AND APPARATUS TO CONFIGURE INFORMATION TECHNOLOGY INFRASTRUCTURE

(71) Applicant: Hitachi, Ltd., Tokyo (JP)

(72) Inventor: Yasutaka Kono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 69 days.

(21) Appl. No.: 15/317,249

(22) PCT Filed: Oct. 27, 2014

(86) PCT No.: PCT/US2014/062335
§ 371 (c)(1),
(2) Date: Dec. 8, 2016

(87) PCT Pub. No.: WO2016/068830
PCT Pub. Date: May 6, 2016

(65) Prior Publication Data
US 2017/0139618 A1   May 18, 2017

(51) Int. Cl.
*G06F 12/00* (2006.01)
*G06F 3/06* (2006.01)

(52) U.S. Cl.
CPC .......... *G06F 3/0619* (2013.01); *G06F 3/0605* (2013.01); *G06F 3/067* (2013.01);
(Continued)

(58) Field of Classification Search
CPC .... G06F 3/0619; G06F 3/0665; G06F 3/0683; G06F 3/0685; G06F 3/0689
See application file for complete search history.

(56) References Cited

U.S. PATENT DOCUMENTS

2002/0120744 A1   8/2002   Chellis et al.
2004/0172220 A1*  9/2004   Prekeges ............. G06F 11/3409
                                                    702/186
(Continued)

FOREIGN PATENT DOCUMENTS

JP   2006-99748 A    4/2006
JP   2013-510360 A   3/2013
(Continued)

OTHER PUBLICATIONS

Japanese Office Action received in corresponding Japanese Application No. 2017-504030 dated Dec. 5, 2017.
(Continued)

*Primary Examiner* — Shawn X Gu
(74) *Attorney, Agent, or Firm* — Mattingly & Malur, PC

(57) ABSTRACT

An aspect of the invention is directed to a management server coupled to a first storage array which executes a given function and coupled to a plurality of second storage arrays. The management server comprises: a memory being configured to store information of hardware configurations of the plurality of second storage arrays and to store information of one or more configuration patterns which realize the given function using a plurality of storage arrays, the plurality of storage arrays including zero or more first storage arrays and zero or more second storage arrays; and a processor, in response to receipt of a request to create configuration for the given function on the plurality of second storage arrays, being configured to select at least one configuration pattern, of the one or more configuration patterns, which can be realized by the hardware configurations of the plurality of second storage arrays.

20 Claims, 20 Drawing Sheets

| | Server HW based Storage Array | Cache Capacity | Storage Capacity | Port | Cost |
|---|---|---|---|---|---|
| 257A | 01 | 10GB | 100GB (SSD)<br>500GB (SATA HDD) | A (4Gbps)<br>B (4Gbps) | $2,000 + $1,000 (SSD) + $200 (SATA HDD) |
| 257B | 02 | 10GB | 1TB (FC HDD) | A (8Gbps) | $2,000 + $600 (FC HDD) |
| 257C | 03 | 50GB | 500GB (SATA HDD) | A (4Gbps) | $4,000 + $200 (SATA HDD) |
| 257D | 04 | 10GB | 100GB (SSD)<br>1TB (SATA HDD) | A (4Gbps)<br>B (4Gbps) | $2,000 + $1,000 (SSD) + $400 (SATA HDD) |
| 257E | 05 | 5GB | 500GB (SATA HDD) | A (4Gbps) | $1,500 + $200 (SATA HDD) |
| 257F | 06 | 10GB | 2TB (SATA HDD) | A (8Gbps) | $2,000 + $800 (SATA HDD) |
| | : | : | : | : | : |

Columns: 2571, 2572, 2573, 2574, 2575 (table 2570)

(52) U.S. Cl.
CPC .......... *G06F 3/0631* (2013.01); *G06F 3/0665* (2013.01); *G06F 3/0689* (2013.01)

(56) References Cited

U.S. PATENT DOCUMENTS

| | | |
|---|---|---|
| 2006/0184740 A1 | 8/2006 | Ishikawa |
| 2007/0180168 A1 | 8/2007 | Chikusa et al. |
| 2008/0162810 A1* | 7/2008 | Taguchi ................ G06F 3/061 |
| | | 711/114 |
| 2010/0049570 A1 | 2/2010 | Li et al. |
| 2012/0011326 A1 | 1/2012 | Higashijima et al. |
| 2012/0030440 A1 | 2/2012 | Miwa et al. |
| 2014/0282824 A1 | 9/2014 | Lango et al. |

FOREIGN PATENT DOCUMENTS

| | | |
|---|---|---|
| WO | 2011/114384 A1 | 9/2011 |
| WO | 2014/150623 A1 | 9/2014 |

OTHER PUBLICATIONS

International Search Report of PCT/US2014/062335 dated Jan. 29, 2015.

\* cited by examiner

|  | Storage Array | Volume | Port | Server Port | Server | Application |
|---|---|---|---|---|---|---|
| 251A | 01 | 01 (1TB) | A (8Gbps) | A (8Gbps) | 01 | 01 (OLTP) |
|  |  | 02 (1TB) | B (8Gbps) | A (8Gbps) | 02 |  |
| 251B | 02 | 01 (500GB) | C (8Gbps) | B (8Gbps) | 02 |  |
|  |  | 02 (300GB) | B (4Gbps) | A (4Gbps) | 03 | 02 (Web) |
|  |  | 03 (200GB) | A (4Gbps) | A (4Gbps) | 03 |  |
| 251C | 03 | 01 (1TB) | D (4Gbps) | C (4Gbps) | 04 | 03 (Mail) |
|  |  | 02 (500GB) | C (4Gbps) | B (4Gbps) | 05 |  |
|  | : | : | : | : | : | : |

Fig. 4

| Storage Array | Cache | Cache Partition | Volume |
|---|---|---|---|
| 01 | 01 (300GB) | 01 (100GB) | 01, 02, 03 |
| | | 02 (100GB) | 04, 05 |
| | | 03 (100GB) | null |
| 01 | 02 (300GB) | 01 (300GB) | 06, 07, 08, 09, 10 |
| 02 | 01 (100GB) | 01 (100GB) | 01, 02 |
| : | : | : | : |

Fig. 5

| Storage Array | Volume | Pool | Pool Element |
|---|---|---|---|
| 01 | 01, 02, 03 | 01 (2000GB) | 01 (SSD, 200GB)<br>02 (FC HDD, 300GB)<br>03 (FC HDD, 300GB)<br>04 (SATA HDD, 600GB)<br>05 (SATA HDD, 600GB) |
| 01 | 04, 05 | 02 (1000GB) | 06 (FC HDD, 200GB)<br>07 (SATA HDD, 400GB)<br>08 (SATA HDD, 400GB) |
| 02 | 01 | 01 (2000GB) | 01 (SATA HDD, 500GB)<br>02 (SATA HDD, 500GB)<br>03 (SATA HDD, 500GB)<br>04 (SATA HDD, 500GB) |
| : | : | : | : |

Fig. 6

|       | 2541 | 2542 | 2543 | 2544 | 2545 |
|-------|------|------|------|------|------|
|       | Storage Array | Volume | Snapshot Volume | Pool | Pool Element |
| 254A  | 01 | 11 | 13, 14, 15 | 11 (2000GB) | 11 (SATA HDD, 400GB)<br>12 (SATA HDD, 400GB)<br>13 (SATA HDD, 400GB)<br>14 (SATA HDD, 400GB)<br>15 (SATA HDD, 400GB) |
| 254B  | 01 | 12 | 16, 17 | 12 (600GB) | 16 (FC HDD, 200GB)<br>17 (FC HDD, 200GB)<br>18 (FC HDD, 200GB) |
| 254C  | 03 | 10 | 11 | 11 (2000GB) | 11 (SATA HDD, 500GB)<br>12 (SATA HDD, 500GB)<br>13 (SATA HDD, 500GB)<br>14 (SATA HDD, 500GB) |
|       | :  | :  | :  | :  | :  |

|       | Storage Array | Group | Source Volume | Target Volume |
|-------|---------------|-------|---------------|---------------|
| 255A  | 01            | 01    | 01            | 04            |
|       |               |       | 02            | 05            |
| 255B  | 02            | 02    | 03            | 06            |
|       | :             | :     | :             | :             |

Fig. 8

| Source Storage Array | Source Group | Source Volume | Source Journal Pool | Target Storage Array | Target Group | Target Volume | Target Journal Pool |
|---|---|---|---|---|---|---|---|
| 01 | 01 | 01 | 01 (1000GB) | 03 | 01 | 11 | 01 (1000GB) |
|  |  | 02 |  |  |  | 12 |  |
| 02 | 02 | 01 | 01 (1000GB) | 04 | 02 | 11 | 01 (1000GB) |
| 02 | 03 | 02 | null | 04 | 03 | 12 | null |
| .. | .. | .. | .. | .. | .. | .. | .. |

Fig. 9

| Server HW based Storage Array | Cache Capacity | Storage Capacity | Port | Cost |
|---|---|---|---|---|
| 01 | 10GB | 100GB (SSD) 500GB (SATA HDD) | A (4Gbps) B (4Gbps) | $2,000 + $1,000 (SSD) + $200 (SATA HDD) |
| 02 | 10GB | 1TB (FC HDD) | A (8Gbps) | $2,000 + $600 (FC HDD) |
| 03 | 50GB | 500GB (SATA HDD) | A (4Gbps) | $4,000 + $200 (SATA HDD) |
| 04 | 10GB | 100GB (SSD) 1TB (SATA HDD) | A (4Gbps) B (4Gbps) | $2,000 + $1,000 (SSD) + $400 (SATA HDD) |
| 05 | 5GB | 500GB (SATA HDD) | A (4Gbps) | $1,500 + $200 (SATA HDD) |
| 06 | 10GB | 2TB (SATA HDD) | A (8Gbps) | $2,000 + $800 (SATA HDD) |
| .. | .. | .. | .. | .. |

Fig. 10

| Storage Array (2581) | Resource Type (2582) | Resource ID (2583) | Historical Data ID (2584) | read IOPS (2585) | write IOPS (2586) |
|---|---|---|---|---|---|
| 01 | Volume | 01 | 01 | 10,000 | 5,000 |
| | | | 02 | 11,000 | 4,000 |
| | | | 03 | 8,000 | 7,000 |
| | | 02 | 01 | 20,000 | 50,000 |
| | | | 02 | 18,000 | 55,000 |
| | | | 03 | 20,000 | 56,000 |
| | Port | A | 01 | 80,000 | 70,000 |
| | | | 02 | 83,000 | 65,000 |
| | | | 03 | 84,000 | 70,000 |
| | | B | 01 | 50,000 | 40,000 |
| | | | 02 | 55,000 | 45,000 |
| | | | 03 | 50,000 | 50,000 |
| : | : | : | : | : | : |

Fig. 11

| Server | Resource Type | Resource ID | Historical Data ID | read IOPS | write IOPS |
|---|---|---|---|---|---|
| 01 | Port | 01 | 01 | 8,000 | 10,000 |
| | | | 02 | 8,100 | 8,000 |
| | | | 03 | 8,000 | 7,000 |
| | | 02 | 01 | 10,000 | 6,000 |
| | | | 02 | 11,000 | 5,500 |
| | | | 03 | 14,000 | 10,000 |
| : | : | : | : | : | : |

| Server HW based Storage Array | Resource Type | Resource ID | Historical Data ID | read IOPS | write IOPS |
|---|---|---|---|---|---|
| 25AA — 01 | Volume | 01 | 01 | 5,000 | 4,000 |
| | | | 02 | 5,100 | 4,500 |
| | | | 03 | 5,200 | 4,000 |
| | Port | A | 01 | 4,500 | 5,100 |
| | | | 02 | 5,000 | 5,000 |
| | | | 03 | 4,600 | 4,900 |
| 25AB — 02 | Volume | 01 | null | 6,000 | 6,000 |
| | Port | A | null | 6,000 | 6,000 |
| .. | .. | .. | .. | .. | .. |

| | ID | Target | Type | Configuration | Condition |
|---|---|---|---|---|---|
| 242A | 01 | Cache Partition | all-in-one | 1(Cache Partition, Volume) | Node.CacheCapacity ≥ CachePartition.Capacity AND Node.Capacity ≥ Volume.Capacity |
| 242B | 02 | | n+1 | 1(Cache Partition, Volume) <= virtualize(n(Volume)) | RepresentativeNode.CacheCapacity ≥ CachePartition.Capacity AND ∀Volume, Node$_i$.Capacity ≥ Volume.Capacity |
| 242C | 03 | | n | n/a | n/a |
| 242D | 04 | Thin Provisioning | all-in-one | 1(Volume, Pool, Pool Element) | ∀PoolElement.Type, Node.Capacity ≥ Σ PoolElement.Capacity |
| 242E | 05 | | n+1 | 1(Volume, Pool) <= virtualize(n(Pool Element)) | ∀PoolElement.Type, $\sum_{i=0}^{n-1}$(Node$_i$.Capacity) ≥ Σ PoolElement.Capacity |
| 242F | 06 | | n | n(divide(Pool, Volume), Volume, Pool Element) | ∀PoolElement.Type, $\sum_{i=0}^{n-1}$(Node$_i$.Capacity) ≥ Σ PoolElement.Capacity |
| 242G | 07 | Snapshot | all-in-one | 1(Volume, Snapshot Volume, Pool, Pool Element) | NodeCapacity ≥ $\sum_{i=0}^{n-1}$(PoolElement$_i$.Capacity) + Volume.Capacity |
| 242H | 08 | | n+1 | 1(Volume, Snapshot Volume, Pool) <= virtualize(n(Pool Element)) | RepresentativeNode.Capacity ≥ Volume.Capacity AND $\sum_{i=0}^{n-1}$(Node$_i$.Capacity) ≥ PoolElement.Capacity |
| 242I | 09 | | n+1 | 1(Snapshot Volume, Pool) <= virtualize(n(Volume), n(Pool Element)) | Node$_0$.Capacity ≥ Volume.Capacity AND $\sum_{i=1}^{n-1}$(Node$_i$.Capacity) ≥ PoolElement.Capacity |
| 242J | 10 | | n | n(divide(Pool, Volume), Volume, Snapshot Volume, Pool Element) | $\sum_{i=0}^{n-1}$(Node$_i$.Capacity) ≥ Σ PoolElement.Capacity |

*FIG. 14*

| | | 2422 | 2423 | 2424 | 2425 |
|---|---|---|---|---|---|
| 242K | | | | | |
| 242L | 11 | Local Replication | all-in-one | 1(Group, Source Volume, Target Volume) | Node.Capacity ≥ Σ SourceVolume.Capacity + Σ TargetVolume.Capacity |
| 242M | 12 | | n+1 | 1(Group, Source Volume) | RepresentativeNode.Capacity ≥ Σ SourceVolume.Capacity AND ∀TargetVolume, Node.Capacity ≥ TargetVolume.Capacity |
| | 13 | | n | n/a | n/a |
| 242N | 14 | Remote Replication (Source side) | all-in-one | 1(Source Group, Source Volume, Source Journal Pool) | Node.Capacity ≥ Σ SourceVolume.Capacity + SourceJournalPool.Capacity |
| 242O | 15 | | n+1 | 1(Source Group, Source Journal Pool) <= virtualize(n(Source Volume)) | RepresentativeNode.Capacity ≥ SourceJournalPool.Capacity AND ∀SourceVolume, Node.Capacity ≥ SourceVolume.Capacity |
| 242P | 16 | | n | n(Source Journal Pool, Source Volume) | ∀SourceVolume, Node.Capacity > SourceVolume.Capacity + $\frac{SourceJournalPool.Capacity}{n}$ |
| 242Q | 17 | Remote Replication (Target side) | all-in-one | 1(Target Group, Target Volume, Target Journal Pool) | Node.Capacity ≥ Σ TargetVolume.Capacity + TargetJournalPool.Capacity |
| 242R | 18 | | n+1 | 1(Target Group, Target Journal Pool) <= virtualize(n(Target Volume)) | RepresentativeNode.Capacity ≥ TargetJournalPool.Capacity AND ∀TargetVolume, Node.Capacity ≥ TargetVolume.Capacity |
| 242S | 19 | | n | n(Target Journal Pool, Target Volume) | ∀TargetVolume, Node.Capacity ≥ TargetVolume.Capacity + $\frac{TargetJournalPool.Capacity}{n}$ |
| | ... | | | | |

FIG. 14 Continued

| | ID | Target | Type | Efficiency | Performance | Cost |
|---|---|---|---|---|---|---|
| 243A | 01 | Cache Partition | all-in-one | 1 | IOPS(Cache) x (hit rate) + IOPS(Volume) x (1 - hit rate) | $(node) x 1 + $(Cache Partitioning SW) x 1 |
| 243B | 02 | | n+1 | 1 | IOPS(Cache) x (hit rate) + Min{IOPS(Cache node), IOPS(NW), IOPS(Volume)} x (1 - hit rate) | $(node) x (n+1) + $(Cache Partitioning SW) x 1 + $(Virtualization SW) |
| 243C | 03 | | n | n/a | n/a | n/a |
| 243D | 04 | Thin Provisioning, Snapshot | all-in-one | 1 | IOPS(Pool Element) | $(node) x 1 + {$(Thin Provisioning SW) x 1 OR $(Snapshot SW) x 1} |
| 243E | 05 | | n+1 | 1 | Min{IOPS(NW), IOPS(Pool Element)} | $(node) x (n+1) + {$(Thin Provisioning SW) x 1 OR $(Snapshot SW) x 1} + $(Virtualization SW) x 1 |
| 243F | 06 | | n | 1/n (worst case) | IOPS(Pool Element) | $(node) x n + {$(Thin Provisioning SW) x n OR $(Snapshot SW) x n} |
| 243G | 10 | Local Replication | all-in-one | 1 | Min{IOPS(Source Volume), IOPS(Target Volume)} | $(node) x 1 + $(Local Replication SW) x 1 |
| 243H | 11 | | n+1 | 1 | Min{IOPS(Source Volume), IOPS(NW), IOPS(Target Volume)} | $(node) x (n+1) + $(Local Replication SW) x 1 + $(Virtualization SW) x 1 |
| 243I | 12 | | n | n/a | n/a | n/a |
| 243J | 13 | Remote Replication | all-in-one | 1 | Min{IOPS(Journal Pool), IOPS(Volume)} | $(node) x 1 + $(Remote Replication SW) x 1 |
| 243K | 14 | | n+1 | 1 | Min{IOPS(Journal Pool), IOPS(NW), IOPS(Volume)} | $(node) x (n+1) + $(Remote Replication SW) x 1 + $(Virtualization SW) x 1 |
| 243L | 15 | | n | 1/n | Min{IOPS(Journal Pool), IOPS(Volume)} | $(node) x n + $(Remote Replication SW) x n |
| | .. | .. | .. | .. | .. | .. |

| 2431 | 2432 | 2433 | 2434 | 2435 | 2436 |

Created Plans: 2410-B

| Plan # | Server HW based storages to be used | Resource Usage Efficiency | Performance | Cost |
|---|---|---|---|---|
| 1 | 50 | 90% | 5,000 IOPS | $3,000 |
| 2 | 36 | 70% | 6,000 IOPS | $3,500 |
| 3 | 70 | 80% | 4,000 IOPS | $3,000 |
| 4 (recommended) | 11 (representative), 12, 13, 14 | 70% | 8,000 IOPS | $10,000 |
| 5 | 20, 21, 22, 23, 24, 25 | 50% | 10,000 IOPS | $20,000 |
| .. | .. | .. | .. | .. |

[Show details] [Cancel]

Fig. 18

METHOD AND APPARATUS TO CONFIGURE INFORMATION TECHNOLOGY INFRASTRUCTURE

BACKGROUND OF THE INVENTION

The present invention relates generally to storage systems and, more particularly, to method and apparatus for configuring information technology (IT) infrastructure.

Software-defined storage which decouples storage functionalities from storage HW (hardware) and realizes it on commoditized server HW has been proposed as a new storage technology. There are several solutions to migrate configurations of a storage array to another. For example, U.S. Patent Application Publication U.S. 2012/0030440 for Storage System Group Including Scale-out Storage System and Management Method Therefor discloses a mechanism for supporting configurations of virtual storage array comprising multiple physical storage arrays.

BRIEF SUMMARY OF THE INVENTION

Exemplary embodiments of the invention provide method and apparatus for creating possible configuration plans for restructuring configurations of storage arrays onto server HW based storage arrays and for estimating resource usage efficiency, performance and cost of configuration plans. In one embodiment, the management program creates configuration plans by using configuration patterns. It also estimates resource usage efficiency, performance, and cost of each configuration plan created.

This invention overcomes a number of problems associated with the currently available solutions. Capabilities (including capacities of storage resources and performances) and cost of a server HW based storage array are typically much lower than those of a specialized HW based storage array (simply referred to as "storage array" in this disclosure). Therefore configurations of a storage array cannot be restructured onto a server HW based storage array just as they are. Furthermore, it is necessary to decompose configurations of a storage array to be restructured onto server HW based storage arrays in keeping with their limitations of capabilities. However, it is difficult to ascertain how each kind of configuration can be decomposed and what the resource usage efficiency, performance, and cost would be in each decomposition case. For example, U.S. 2012/0030440 does not disclose creating possible configuration plans for restructuring configurations of storage arrays onto server HW based storage arrays or estimating resource usage efficiency, performance and cost of configuration plans.

An aspect of the present invention is directed to a management server coupled to a first storage array which executes a given function and coupled to a plurality of second storage arrays. The management server comprises: a memory being configured to store information of hardware configurations of the plurality of second storage arrays and to store information of one or more configuration patterns which realize the given function using a plurality of storage arrays, the plurality of storage arrays including zero or more first storage arrays and zero or more second storage arrays; and a processor, in response to receipt of a request to create configuration for the given function on the plurality of second storage arrays, being configured to select at least one configuration pattern, of the one or more configuration patterns, which can be realized by the hardware configurations of the plurality of second storage arrays.

In some embodiments, the processor is configured to: create a configuration plan for each of the at least one selected configuration pattern, to produce at least one configuration plan; estimate resource usage efficiency, performance, and cost of each of the at least one configuration plan; and choose a recommended configuration plan which has a lowest cost among the at least one configuration plan and which has a performance greater than a preset required performance.

In specific embodiments, the processor is configured to: create a configuration plan for each of the at least one selected configuration pattern, to produce at least one configuration plan; estimate resource usage efficiency, performance, and cost of each of the at least one configuration plan; and display a list of the at least one configuration plan, a selectable button to select a configuration plan from the list, and a show details button to show details of the selected configuration plan. The second storage arrays may be server HW (hardware) based storage arrays.

The one or more configuration patterns include a cache partition pattern of an n+1 type having one or more sets, each set having one representative node and one or more other nodes, the representative node having one or more cache partitions and the one or more other nodes having storage volumes using the cache partitions, the storage volumes being virtualized to the representative node. The representative node has a cache capacity larger than a cache capacity of cache partition in an original configuration, and, for each volume, the capacity of the node is larger than the capacity of the volume, the first storage array being restructured onto the second storage arrays in the original configuration.

In specific embodiments, the one or more configuration patterns include a thin provisioning pattern of an n+1 type having a representative node and other nodes, the representative node having a thin provisioning pool and all volumes curved from the thin provisioning pool and the other nodes having pool elements, the pool elements being virtualized to the representative node. For each type of pool element, a total capacity of the nodes is larger than a total capacity of the type of pool element.

In some embodiments, the one or more configuration patterns include a snapshot pattern of an n+1 type having a representative node and other nodes, the representative node having a snapshot pool and snapshot volumes and the other nodes having storage volumes and pool elements. For each storage volume, one of the other nodes has a capacity larger than a capacity of the storage volume, and a total capacity of the remaining other nodes is larger than a total capacity of all the pool elements.

In specific embodiments, the one or more configuration patterns include a snapshot pattern of an n type, a snapshot pool is divided into a plurality of divided pools for each of the volumes using an original pool on the first array which is restructured onto the second storage arrays, and one node has a divided pool, a volume, snapshot volumes of the volume, and pool elements. A total capacity of all nodes is larger than a total capacity of all pool elements.

In some embodiments, the one or more configuration patterns include a remote replication pattern of an n+1 type having a representative source node and other source nodes on a source side, the representative source node having a source group and a source journal pool, the other source nodes having source volumes of the source group, the source volumes being virtualized to the representative source node. The representative source node has a capacity larger than a capacity of the source journal pool, and, for each source volume, the source node has a capacity larger than a capacity of the source volume. The one or more configuration patterns include a target replication pattern of an n+1 type having a representative target node and other target nodes on a target side, the representative target node having a target group and a target journal pool, the other target nodes having target volumes of the target group, the source volumes being virtualized to the representative target node. The representative target node has a capacity larger than a capacity of the target journal pool, and, for each target volume, the target node has a capacity larger than a capacity of the target volume.

Another aspect of the invention is directed to a method of managing a first storage array which executes a given function. The method comprises: storing information of hardware configurations of a plurality of second storage arrays; storing information of one or more configuration patterns which realize the given function using a plurality of storage arrays, the plurality of storage arrays including zero or more first storage arrays and zero or more second storage arrays; and in response to receipt of a request to create configuration for the given function on the plurality of second storage arrays, selecting at least one configuration pattern, of the one or more configuration patterns, which can be realized by the hardware configurations of the plurality of second storage arrays.

Another aspect of this invention is directed to a non-transitory computer-readable storage medium storing a plurality of instructions for controlling a data processor to managing a first storage array which executes a given function. The plurality of instructions comprise: instructions that cause the data processor to store information of hardware configurations of a plurality of second storage arrays; instructions that cause the data processor to store information of one or more configuration patterns which realize the given function using a plurality of storage arrays, the plurality of storage arrays including zero or more first storage arrays and zero or more second storage arrays; and instructions that cause the data processor, in response to receipt of a request to create configuration for the given function on the plurality of second storage arrays, to select at least one configuration pattern, of the one or more configuration patterns, which can be realized by the hardware configurations of the plurality of second storage arrays.

These and other features and advantages of the present invention will become apparent to those of ordinary skill in the art in view of the following detailed description of the specific embodiments.

BRIEF DESCRIPTION OF THE DRAWINGS

FIG. 4 shows an example of the storage array configuration table.

FIG. 5 shows an example of the cache partition table.

FIG. 6 shows an example of the thin provisioning configuration table.

FIG. 7 shows an example of the snapshot configuration table.

FIG. 8 shows an example of the local replication configuration table.

FIG. 9 shows an example of the remote replication configuration table.

FIG. 10 shows an example of the server HW based storage array configuration table.

FIG. 11 shows an example of the storage array performance table.

FIG. 12 shows an example of the server performance table.

FIG. 13 shows an example of the server HW based storage array performance table.

FIG. 14 shows an example of the configuration pattern table.

FIG. 15 shows an example of the pattern evaluation basis table.

FIG. 18 shows an example of a plan list GUI of the management program.

DETAILED DESCRIPTION OF THE INVENTION

Figure 1:
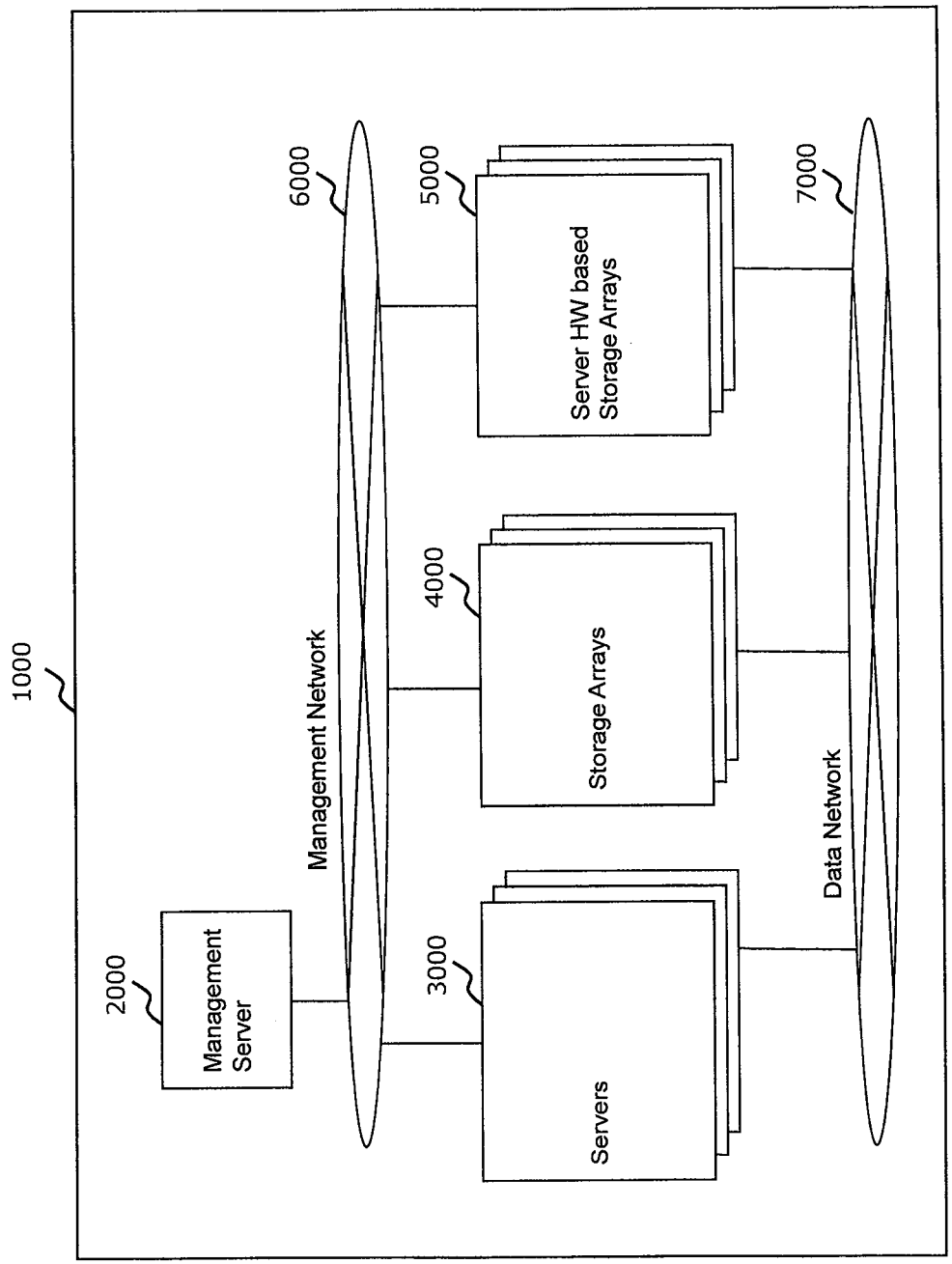
FIG. 1 illustrates an example of a physical configuration of the computer system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, andor may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for configuring IT infrastructure. More specifically, embodiments of the invention provide a management program that creates configuration plans for restructuring configurations of storage arrays onto commoditized server HW based storage arrays.

FIG. 1 illustrates an example of a physical configuration of the computer system in which the method and apparatus of the invention may be applied. Computer system 1000 includes management server 2000, servers 3000, storage arrays 4000, server HW based storage arrays 5000, management network 6000, and data network 7000. Servers 3000, storage arrays 4000, and server HW based storage arrays 5000 are connected via data network 7000. This network can be LAN (Local Area Network) or WAN (Wide Area Network), but is not limited to them. Management server 2000, servers 3000, storage arrays 4000, and server HW based storage arrays 5000 are connected via management network 6000. This Network is usually LAN, but it is not limited to LAN. Although the management network and data network are separate in this embodiment, they can be a single converged network. In this embodiment, management server 2000 and servers 3000 are separate, but the invention is not limited to this. For example, any server can host a management program. In this embodiment, servers 3000, storage arrays 4000, and server HW based storage arrays 5000 are separate, but the invention is not limited to this. For example, servers 3000, storages arrays 4000, and server HW based storage arrays 5000 can be converged into one system.

Figure 2:
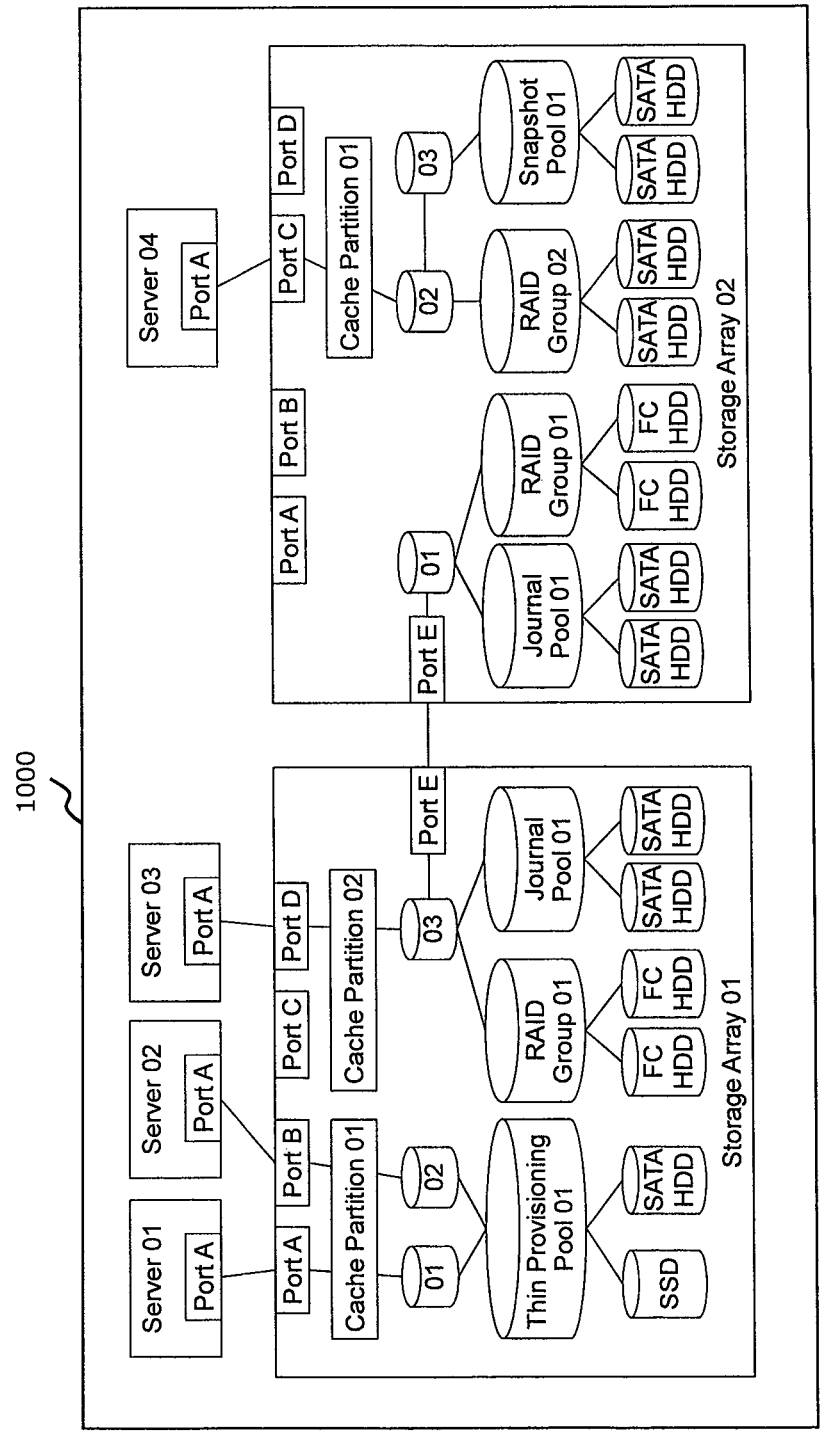
FIG. 2 shows an example of a logical configuration of the computer system of FIG. 1.

FIG. 2 shows an example of a logical configuration of the computer system 1000 of FIG. 1. Storage Volumes 01 and 02 are curved (i.e., created or assigned) from Thin Provisioning Pool 01 on Storage Array 01. Storage Volume 03 is curved from RAID Group 01 on Storage Array 01. Thin Provisioning Pool 01 includes one SSD and one SATA HDD. RAID Group 01 has two FC HDDs. Storage Volume 01 is assigned to Server 01 via Port A of Storage Array 01 and Port A of Server 01. Storage Volume 02 is assigned to Server 02 via Port B of Storage Array 01 and Port A of Server 02. Cache Partition 01 is assigned to Storage Volume 01 and Storage Volume 02. Storage Volume 03 is assigned to Server 03 via Port D of Storage Array 01 and Port A of Server 03. Storage Volume 03 is remotely replicated to Storage Volume 01 of Storage Array 02 via Port E of Storage Array 01 and Port E of Storage Array 02. The replicated data are transferred using Journal Pool 01 of Storage Array 01 as a send-buffer and Journal Pool 01 of Storage Array 02 as a receive-buffer. Both Journal Pools have two SATA HDDs, respectively. Storage Volume 02 of Storage Array 02 is curved from RAID Group 02 and assigned to Server 04 via Port C of Storage Array 02 and Port A of Server 04. Storage Volume 03 of Storage Array 02 is a snapshot volume of Storage Volume 02. When some data are written into Storage Volume 02 of Storage Array 02 after the snapshot is taken, the original data are stored in Snapshot Pool 01.

Figure 3:
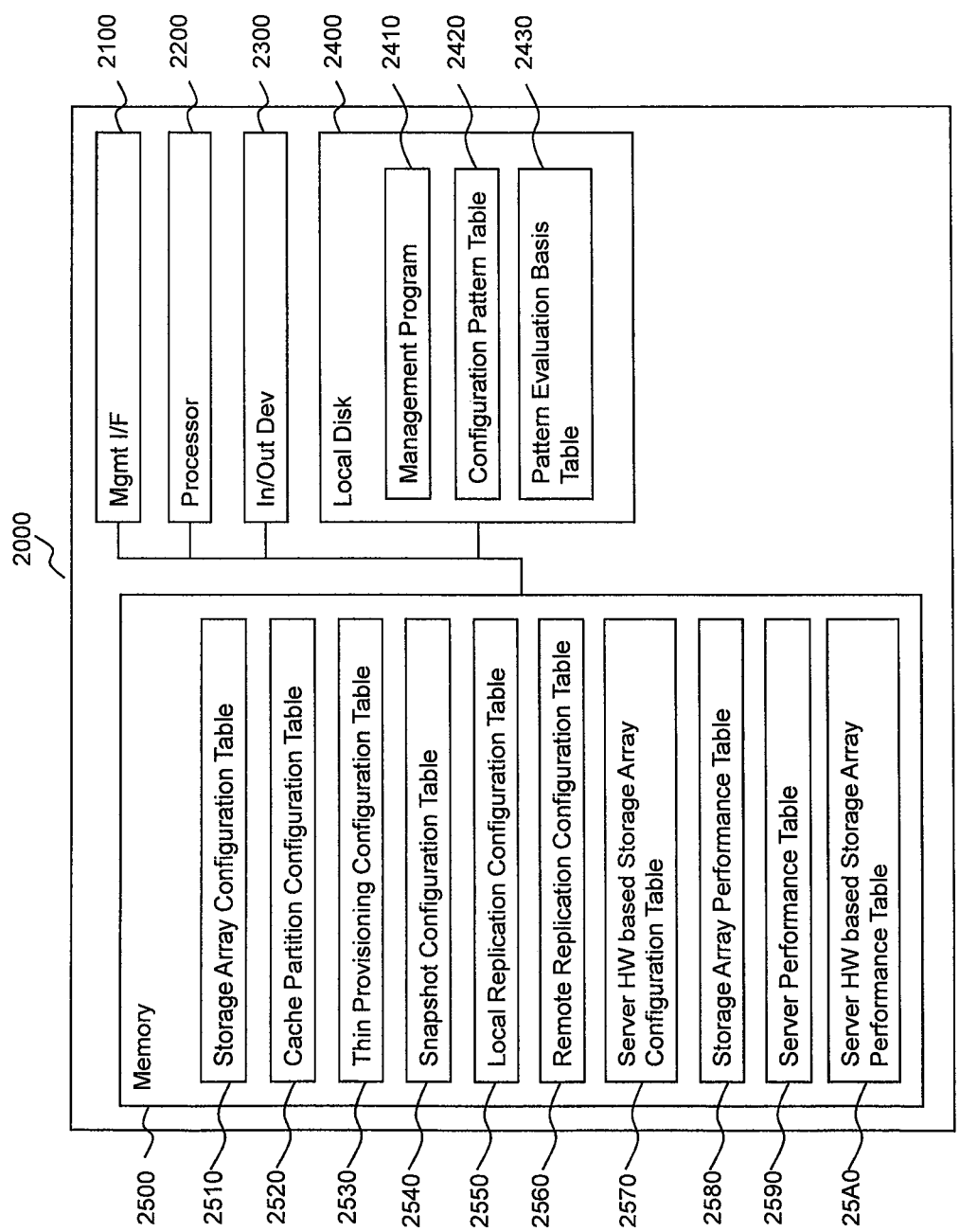
FIG. 3 shows an example of the configuration of management server.

FIG. 3 shows an example of the configuration of management server 2000. Management interface 2100 is an interface to the management network 6000. Input and output device 2300 is a device for user interactions such as a monitor, a keyboard, and a mouse. Local disk 2400 contains management program 2410, configuration pattern table 2420 (FIG. 14), and evaluation basis table 2430 (FIG. 15). Management program 2410 is loaded into memory 2500 and executed by processor 2200. Procedure of the management program 2410 is described herein below. Configuration pattern table 2420 and pattern evaluation basis table 2430 are loaded into memory 2500 and used by the management program 2410. These tables are described herein below. Memory 2500 contains storage array configuration table 2510 (FIG. 4), cache partition configuration table 2520 (FIG. 5), thin provisioning configuration table 2530 (FIG. 6), snapshot configuration table 2540 (FIG. 7), local replication configuration table 2550 (FIG. 8), remote replication configuration table 2560 (FIG. 9), server HW based storage array configuration table 2570 (FIG. 10), storage array performance table 2580 (FIG. 11), server performance table 2590 (FIG. 12), and server HW based storage array performance table 25A0 (FIG. 13). These tables are described herein below.

FIG. 4 shows an example of the storage array configuration table 2510. This table is created in the memory 2500 by the management program 2410. Column 2511 shows identifications of storage arrays. Column 2512 shows identifications and capacities of storage volumes. Column 2513 shows identifications and capabilities of ports of storage arrays. Column 2514 shows identifications and capabilities of ports of servers. Column 2515 shows identifications of servers. Column 2516 shows identifications and names of applications running on servers.

Each row shows configurations of a storage array. For example, row 251A shows configurations of storage array 01. The storage array has two 1 TB of storage volumes (01 and 02). The storage volume 01 is assigned to the server 01 via port A of the storage array 01 and the port A of the server 01. The application 01 whose name is OLTP is running on the server 01. The application 01 uses three storage volumes (01 and 02 of the storage array 01 and 01 of the storage array 02).

FIG. 5 shows an example of the cache partition table 2520. This table is created in the memory 2500 by the management program 2410. Column 2521 shows identifications of storage arrays. Column 2522 shows identifications and capacities of cache memories of storage arrays. Column 2523 shows identifications and capacities of partitions of cache memories. Column 2524 shows identifications of storage volumes to which cache partitions are assigned.

Each row shows configurations of a cache memory. For example, row 252A shows configurations of cache 01 of storage array 01. The cache 01 has three partitions (01, 02 and 03) and their capacities are 100GB each. The cache partition 01 is assigned to the storage volume 01, 02 and 03. The cache partition 02 is assigned to the storage volume 04 and 05. The cache partition 03 is not assigned to any storage volumes yet.

FIG. 6 shows an example of the thin provisioning configuration table 2530. This table is created in the memory 2500 by the management program 2410. Column 2531 shows identifications of storage arrays. Column 2532 shows identifications of thin provisioning volumes. Column 2533 shows identifications of thin provisioning pools. Column 2534 shows identifications, media types and capacities of pool elements.

Each row shows configurations of a thin provisioning pool. For example, row 253A shows the configuration of the thin provisioning pool 01 of the storage array 01. The thin provisioning pool 01 has 2000 GB capacity provided by five pool elements (01, 02, 03, 04, and 05). The pool element 01 is 200 GB of SSD storage media. The pool elements 02 and 03 are 300 GB of FC HDD storage media. The pool elements 04 and 05 are 600 GB of SATA HDD storage media. Three thin provisioning volumes (01, 02 and 03) are curved from the thin provisioning pool 01.

FIG. 7 shows an example of the snapshot configuration table 2540. This table is created in the memory 2500 by the management program 2410. Column 2541 shows identifications of storage arrays. Column 2542 shows identifications of storage volumes. Column 2543 shows identifications of snapshot volumes. Column 2544 shows identifications and capacities of snapshot pools. Column 2545 shows identifications, media types, and capacities of pool elements.

Each row shows configurations of a snapshot pool. For example, row 254A shows configurations of the snapshot pool 11 of the storage array 01. The snapshot pool 11 has 2000 GB capacity provided by five pool elements (11, 12, 13, 14, and 15). All of these pool elements are 400 GB of SATA HDD storage media. Three snapshot volumes (13, 14, and 15) are created for the storage volume 11.

FIG. 8 shows an example of the local replication configuration table 2550. This table is created in the memory 2500 by the management program 2410. Column 2551 shows identifications of storage arrays. Column 2552 shows identifications of replication groups. Column 2553 shows identifications of replication source volumes. Column 2554 shows identifications of replication target volumes.

Each row shows configurations of a replication group. For example, row 255A shows configurations of the replication group 01 of the storage array 01. The replication group 01 has two pairs of source volumes and target volumes (01-04 pair and 02-05 pair) as its member.

FIG. 9 shows an example of the remote replication configuration table 2560. This table is created in the memory 2500 by the management program 2410. Column 2561 shows identifications of storage arrays on the replication source side. Column 2562 shows identifications of replication groups on the replication source side. Column 2563 shows identifications of replication source volumes. Column 2564 shows identifications and capacities of journal pools on the replication source side. Column 2565 shows identifications of storage arrays on the replication target side. Column 2566 shows identifications of replication groups on the replication target side. Column 2567 shows identifications of replication target volumes. Column 2568 shows identifications and capacities of journal pools on the replication target side.

Each row shows configurations of a pair of replication groups on the source side and target side. For example, row 256A shows a pair of the source group 01 on source storage array 01 and the target group 01 on target storage array 03. The source group 01 has two pairs of source volumes and target volumes (01-11 pair and 02-12 pair) as its member. The source journal pool 01 has 1000 GB capacity and is assigned to the source group 01. The target journal pool 01 has 1000 GB capacity and is assigned to the target group 01.

FIG. 10 shows an example of the server HW based storage array configuration table 2570. This table is created in the memory 2500 by the management program 2410. Column 2571 shows identifications of server HW based storage arrays. Column 2572 shows capacities of cache memories of the server HW based storage arrays. Column 2573 shows storage capacities of the server HW based storage arrays. Column 2574 shows identifications and capabilities of ports of the server HW based storage arrays. Column 2575 shows costs of the server HW based storage arrays.

Each row shows configurations of a server HW based storage array. For example, row 257A shows configurations of the server HW based storage array 01. The server HW based storage array 01 has 10 GB of cache memory, 100 GB of SSD storage, 500 GB of SATA HDD storage, and two 4 Gpbs of ports. The total cost of the server HW based storage array 01 is $3,200 ($2,000+$1,000+$200).

FIG. 11 shows an example of the storage array performance table 2580. This table is created in the memory 2500 by the management program 2410. Column 2581 shows identifications of storage arrays. Column 2582 shows types of resources. Column 2583 shows identifications of resources. Column 2584 shows identifications of historical performance data of the resources. Timestamps may be used as the ID. Column 2585 shows read IOPS of the resources. Column 2586 shows write IOPS of the resources.

Each row shows historical performance data of a storage array. For example, row 258A shows performance data of two storage volumes (01 and 02) and two ports (A and B) of the storage array 01 and each of them has at least three historical data (from 01 to 03 ). This table has only read IOPS and write IOPS as performance data in this embodiment but the invention is not limited to them. Other types of performance data such as throughput can be contained in the table.

FIG. 12 shows an example of the server performance table 2590. This table is created in the memory 2500 by the management program 2410. Column 2591 shows identifications of servers. Column 2592 shows types of resources. Column 2593 shows identifications of resources. Column 2594 shows identifications of historical performance data of the resources. Timestamps may be used as the ID. Column 2595 shows read IOPS of the resources. Column 2596 shows write IOPS of the resources.

Each row shows historical performance data of a server. For example, row 259A shows performance data of two ports (01 and 02) of the server 01 and each of them has at least three historical data (from 01 to 03). This table has only read IOPS and write IOPS as performance data in this embodiment but the invention is not limited to them. Other types of performance data such as throughput can be contained in the table.

FIG. 13 shows an example of the server HW based storage array performance table 25A0. This table is created in the memory 2500 by the management program 2410. Column 25A1 shows identifications of server HW based storage arrays. Column 25A2 shows types of resources. Column 25A3 shows identifications of resources. Column 25A4 shows identifications of historical performance data of the resources. Timestamps may be used as the ID. Column 25A5 shows read IOPS of the resources. Column 25A6 shows write IOPS of the resources.

Each row shows historical performance data of a server HW based storage array. For example, row 25AA shows performance data of a storage volume (01) and a port (A) of the server HW based storage array 01 and each of them has at least three historical data (from 01 to 03). Row 25AB shows another example of performance data with null value in the historical data ID 25A4. The null value means that the server HW based storage array 02 has not been used and has no historical performance data yet. The values of read IOPS and write IOPS of the row 25AB are predefined catalog spec data. This table has only read IOPS and write IOPS as performance data in this embodiment but the invention is not limited to them. Other types of performance data such as throughput can be contained in the table.

FIG. 14 shows an example of the configuration pattern table 2420. This table is loaded from the local disk 2400 to the memory 2500 by the management program 2410. Column 2421 shows identifications of configuration patterns. Column 2422 shows targets to which the configuration patterns are applied. Column 2423 shows types of configuration patterns. Column 2424 shows configurations of the patterns. Column 2425 shows conditions for node selection for each pattern. In this embodiment, conditions related to capacity are shown in FIG. 14 but the invention is not limited to this. Other conditions such as performance (IOPS, response time, etc.) or availability can be contained.

Each row shows a configuration pattern for restructuring configurations of storage arrays onto the server HW based storage arrays. For example, rows 242A, 242B, and 242C show patterns for cache partition configurations.

Row 242A is an "all-in-one" pattern which means that a single server HW based storage array has a cache partition and all storage volumes using the cache partition. In case that this pattern is applied to the cache partition 01 of storage array 01 in FIG. 2, the cache partition 01, storage volume 01, and storage volume 02 will be configured in a single server HW based storage array. The node must have a cache capacity larger than the capacity of cache partition in the original configuration and, for each storage volume, the node must have a capacity larger than the capacity of the storage volume in the original configuration (the "original configuration" means the configuration of a storage array being restructured onto server HW based storage arrays).

Row 242B is an "n+1" pattern which has one or more sets of one representative node and one or more other nodes. In this pattern, the representative node has one or more cache partitions and other nodes have storage volumes using the cache partitions. The storage volumes are virtualized to the representative node. In case that this pattern is applied to the cache partition 01 of storage array 01 in FIG. 2, the representative node has the cache partition 01 and the other nodes have storage volume 01 and storage volume 02. The number of nodes depends on the storage capacities that the nodes have. The representative node must have a cache capacity larger than the capacity of cache partition in original configuration. Also, for each storage volume, the capacity of the node must be larger than the capacity of the storage volume.

Row 242C shows that the "n" pattern cannot be applied to configurations of cache partition.

Row 242D, 242E and 242F show patterns for thin provisioning configurations.

Row 242D is an "all-in-one" pattern which means that a single node has a pool, all volumes curved from the pool, and all pool elements of the pool. In case that this pattern is applied to the thin provisioning pool 01 in FIG. 2, a single node has the pool 01, the storage volume 01, the storage volume 02, and two pool elements (SSD and SATA HDD). For each type of pool element, the capacity of the node must be larger than total capacity of the type of pool elements.

Row 242E is an "n+1" pattern which means that a representative node has a thin provisioning pool and all volumes curved from the pool and the other nodes have pool elements. The pool elements are virtualized to the representative node. In case that this pattern is applied to thin provisioning pool 01 in FIG. 2, a representative node has the pool 01 and the storage volume01 and the storage volume 02. The other nodes have pool elements. The number of nodes depends on the capacities of each type of storage media that the nodes have. For each type of pool element, the total capacity of the nodes must be larger than the total capacity of the type of pool element.

Row 242F is an "n" pattern. In this pattern, a thin provisioning pool is divided into some pools for each of the volumes curved from the original pool (the "original pool" means the storage pool on a storage array being restructured onto server HW based storage arrays). One node has a divided pool, a volume, and pool elements. In case that this pattern is applied to the thin provisioning pool 01 in FIG. 2, the pool is divided into two pools because the number of volumes curved from the pool 01 is two. One divided pool, the storage volume 01, and pool elements are held by one node. Another divided pool, the storage volume 02, and pool elements are held by another node. The two nodes must have SSD storage media and SATA HDD storage media, respectively. For each type of pool element, the total capacity of the nodes must be larger than the total capacity of the type of pool element.

Row 242G, 242H, 242I and 242J show patterns for snapshot configurations.

Row 242G is an "all-in-one" pattern which means that a single node has a snapshot pool, storage volumes, snapshot volumes, and pool elements. In case that this pattern is applied to the snapshot pool 01 in FIG. 2, a single node has the snapshot pool 01, storage volume 02, snapshot volume 03, and two pool elements. For each storage volume, the node must have a capacity larger than the total capacity of all pool elements plus the capacity of the storage volume.

Row 242H is an "n+1" pattern which means that a representative node has a snapshot pool, storage volumes, and snapshot volumes, and the other nodes have pool elements. The pool elements are virtualized to the representative node. In case that this pattern is applied to the snapshot pool 01 in FIG. 2, a representative node has the snapshot pool 01, storage volume 02, and snapshot volume 03, and the other nodes have pool elements. The number of the other nodes depends on the capacities of each type of storage media that the nodes have. For each storage volume, the representative node must have a capacity larger than the capacity of the storage volume. The total capacity of other nodes must be larger than the total capacity of all pool elements.

Row 2421 is another "n+1" pattern which means that a representative node has a snapshot pool and snapshot volumes, and the other nodes have storage volumes and pool elements. Storage volumes and pool elements can be held by either a single node or multiple nodes. The number of the other nodes depends on the capacities of each type of storage media that the nodes have. There are no conditions for the representative node in this case. For each storage volume, one of the other nodes must have a capacity larger than the capacity of the storage volume and the total capacity of the remaining other nodes must be larger than total capacity of all pool elements.

Row 242J is an "n" pattern. In this pattern, a snapshot pool is divided into some pools for each of the volumes using the original pool (the "original pool" means the storage pool on a storage array being restructured onto server HW based storage arrays). One node has a divided pool, a volume, snapshot volumes of the volume, and pool elements. In case that this pattern is applied to the snapshot pool 01 in FIG. 2, the pool cannot be divided because the number of volumes using the pool 01 is only one. The snapshot pool 01, the storage volume 02, snapshot volume 03, and pool elements are held by one node. The node must have SATA HDD storage media. The total capacity of all nodes must be larger than the total capacity of all pool elements.

Row 242K, 242L and 242M show patterns for local replication configurations.

Row 242K is an "all-in-one" pattern which means that a single node has a replication group, source volumes, and target volumes of the group. The node must have a capacity larger than total capacity of all source volumes plus the total capacity of all target volumes.

Row 242L is an "n+1" pattern which means that a representative node has a replication group and source volumes of the group, and the other nodes have target volumes of the group. The target volumes are virtualized to the representative node. The representative node must have a capacity larger than the total capacity of all source volumes. For each target volume, the capacity of the node must be larger than the capacity of the target volume.

Row 242M shows that the "n" pattern cannot be applied to configurations of local replication.

Row 242N, 2420 and 242P show patterns for remote replication configurations on source side.

Row 242N is an "all-in-one" pattern which means that a single node has a source group, source volumes in the group, and a source journal pool. In case that this pattern is applied to the remote replication between storage volume 04 of storage array 01 and storage volume 01 of storage array 02 in FIG. 2, a single node has a source group (not shown in the diagram), storage volume 04 (source volume), and journal pool 01 of storage array 01. The node must have a capacity larger than the total capacity of all source volumes plus the capacity of the source journal pool.

Row 2420 is an "n+1" pattern which means that a representative node has a source group and a source journal pool, and the other nodes have source volumes of the group. The source volumes are virtualized to the representative node. In case that this pattern is applied to the remote replication between storage volume 04 of storage array 01 and storage volume 01 of storage array 02 in FIG. 2, a representative node has a source group (not shown in the diagram) and the journal pool 01 of storage array 01. The other node has the storage volume 04 (source volume) of the storage array 01. The representative node must have a capacity larger than the capacity of the source journal pool. For each source volume, the node must have a capacity larger than the capacity of the source volume.

Row 242P is an "n" pattern which means that multiple nodes have a journal pool and one or more source volumes. For each source volume, the node must have a capacity larger than the capacity of the source volume plus the capacity of the source journal pool divided by the number of nodes.

Row 242Q, 242R, and 242S show patterns for remote replication configurations on the target side. These patterns are similar to row 242N, 2420, and 242P, respectively.

FIG. 15 shows an example of the pattern evaluation basis table 2430. This table is loaded from local disk 2400 to memory 2500 by the management program 2410. Column 2431 shows identifications of evaluation bases. Column 2432 shows targets to which the configuration patterns are applied. Column 2433 shows types of configuration patterns. Column 2434 shows evaluation basis for resource usage efficiency of the configuration pattern. Column 2435 shows evaluation basis for performance of the configuration pattern. Column 2436 shows evaluation basis for cost of the configuration pattern.

Each row shows the evaluation basis for a configuration pattern. For example, row 243A shows an evaluation basis for "all-in-one" pattern of cache partition configurations. The resource usage efficiency of the configuration pattern is the same as that of the original cache partition configurations on storage arrays. The performance and cost of the configuration pattern are calculated by the formulas in the table, respectively.

Figure 16:
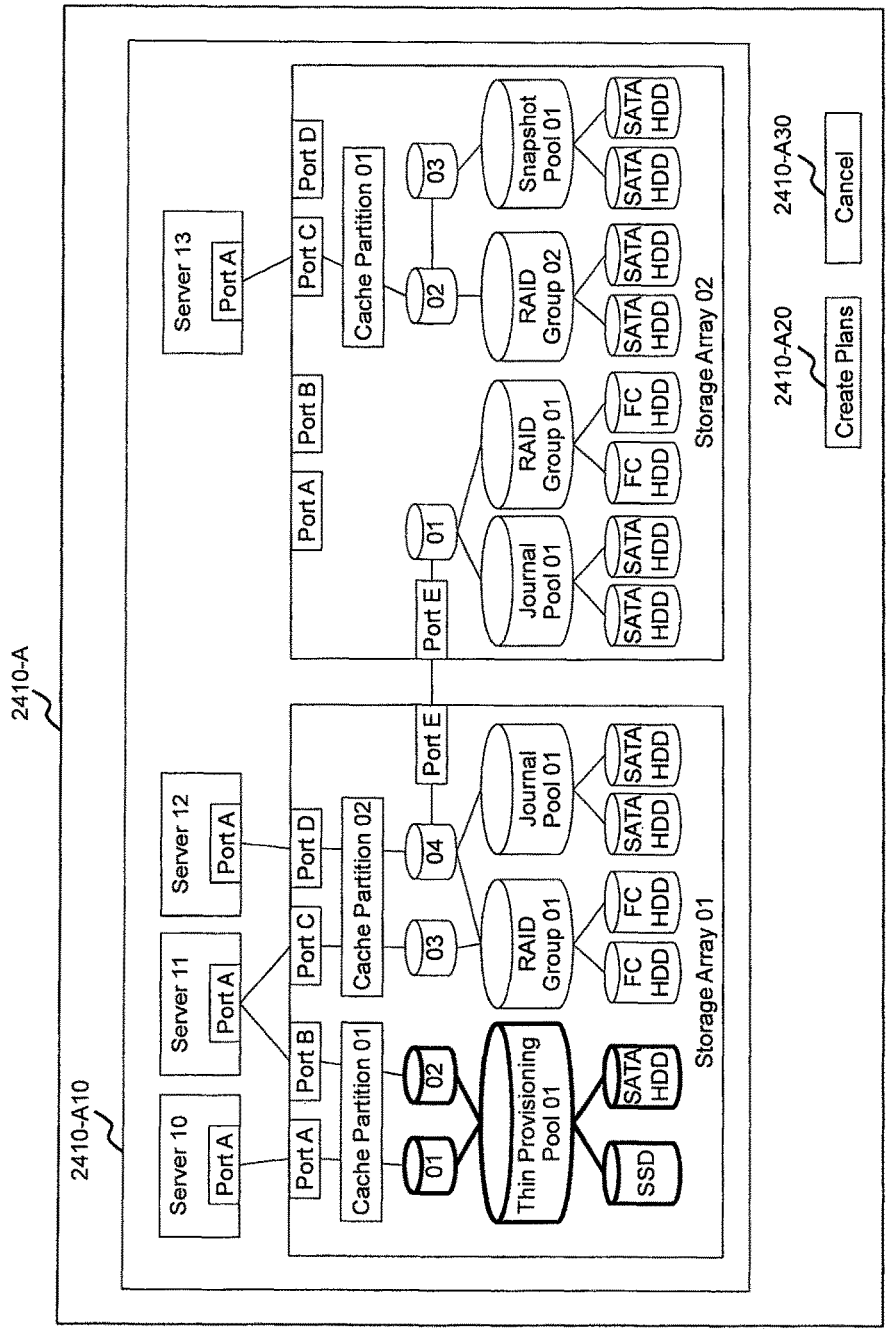
FIG. 16 shows an example of a plan creation GUI (graphical user interface) of the management program.

FIG. 16 shows an example of a plan creation GUI (graphical user interface) 2410-A of the management program 2410. Field 2410-A10 shows configurations of storage arrays and servers. The users (storage administrators) can select a part of the configurations. In this example, thin provisioning pool 01, storage volume 01, storage volume 02, and two pool elements of storage array 01 are selected. If the "Create Plans" button 2410-A20 is clicked, the management program 2410 creates configuration plans for restructuring the selected part of the storage array onto the server HW based storage arrays. The flow of this process is described herein below. If the "Cancel" button 2410-A30 is clicked, the management program 2410 cancels the process.

Figure 17:
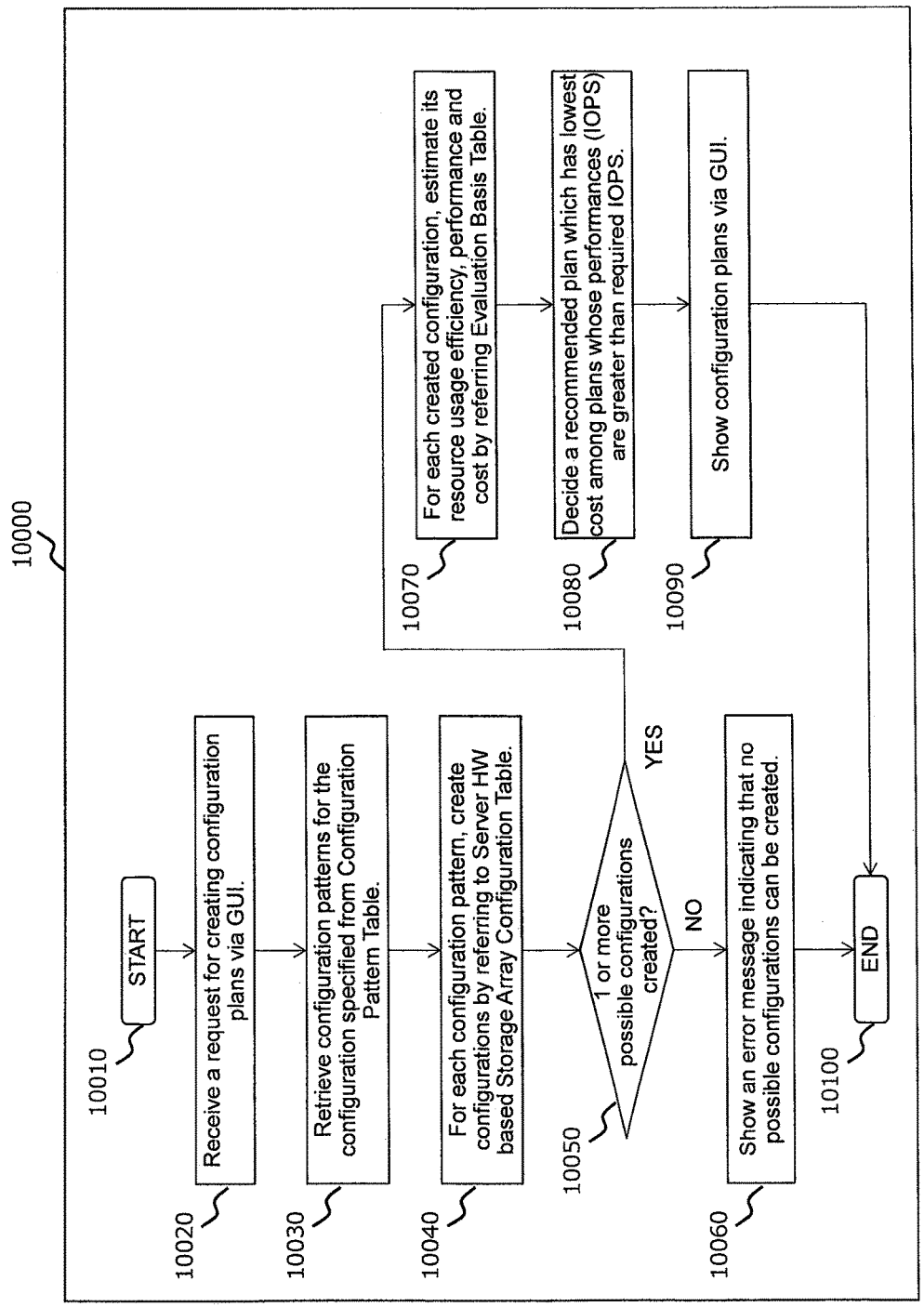
FIG. 17 shows an example of a flow diagram illustrating a process of the management program for creating configuration plans.

FIG. 17 shows an example of a flow diagram illustrating a process of the management program 2410 for creating configuration plans. Step 10010 is the start of this procedure. In step 10020, the management program 2410 receives a request for creating configuration plans via its GUI 2410-A. The configuration information of the selected part is passed to the management program 2410. In step 10030, the management program 2410 retrieves configuration patterns from the configuration pattern table 2420. In case that thin provisioning pool 01 is selected as shown in FIG. 16, row 242D, row 242E, and row 242F of the configuration pattern table 2420 are retrieved. In step 10040, the management program 2410 creates configuration plans for each configuration pattern. This is done by referring to configuration 2424 of the configuration pattern table 2420 and the server HW based storage array configuration table 2570. In step 10050, the management program 2410 judges whether one or more possible configuration plans were created in step 10040 or not. If the result is "Yes," then the process proceeds to step 10070. If the result is "No," then the process proceeds to step 10060.

In step 10060, the management program 2410 shows an error message indicating that no possible configurations can be created. In step 10070, the management program 2410 estimates resource usage efficiency, performance, and cost of each created configuration plan. This is done by referring to the pattern evaluation basis table 2430, server HW based storage array configuration table 2570, and server HW based storage array performance table 25A0. In step 10080, the management program 2410 decides a recommended plan which has the lowest cost among plans whose performances (IOPS) are greater than the required IOPS. In step 10090, the management program 2410 shows the created configuration plans via GUI (FIG. 18). In step 10100, the process ends.

Figure 19:
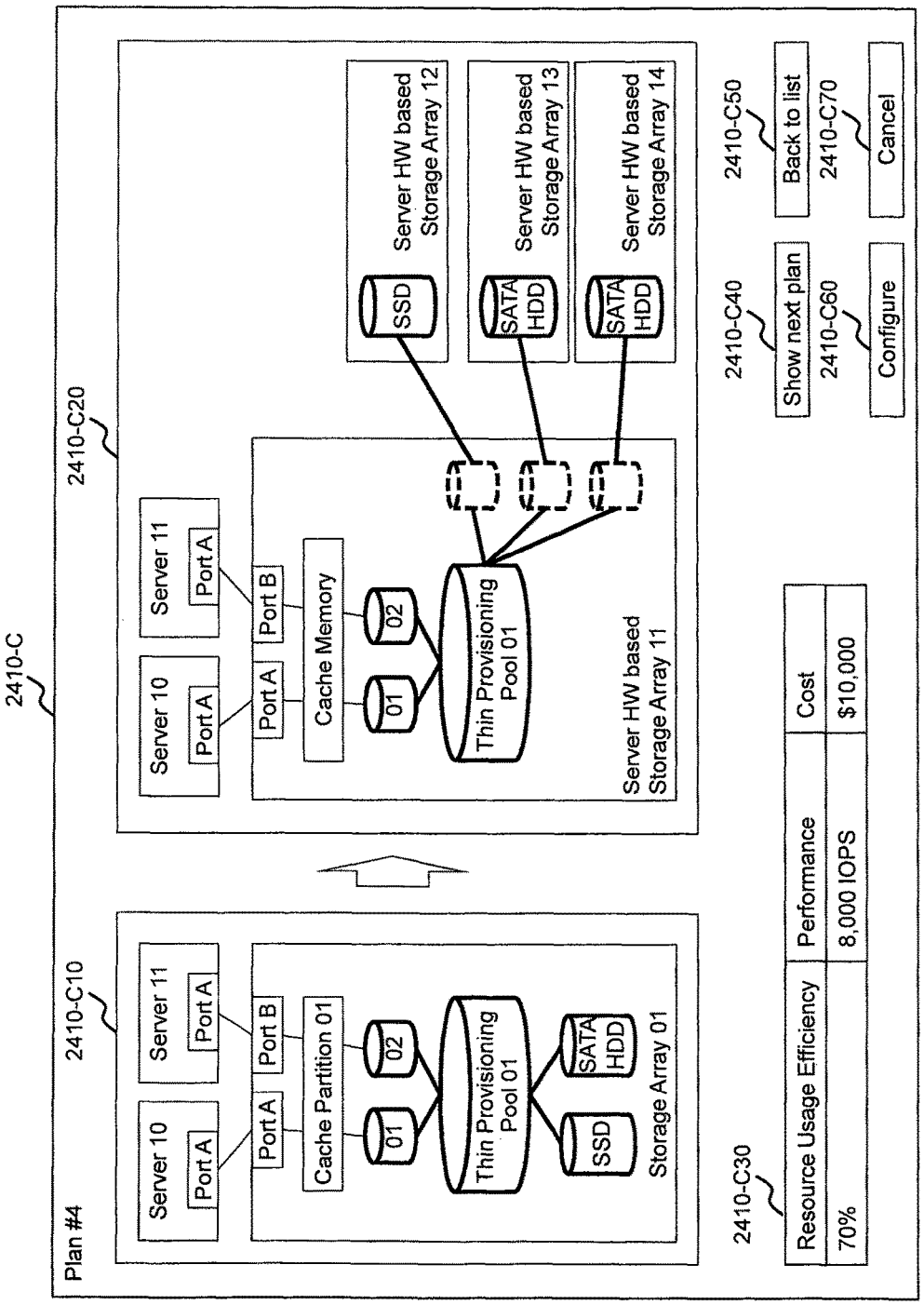
FIG. 19 shows a plan detail GUI of the management program.

FIG. 18 shows an example of a plan list GUI 2410-B of the management program 2410. Field 2410-610 shows a list of created configuration plans. It has columns of exclusively selectable button 2410-B11, plan number 2410-B12, server HW based storage array to be used 2410-B13, estimated resource usage efficiency 2410-B14, estimated performance 2410-B15, and estimated cost 2410-B16. If the "Show details" button 2410-B20 is clicked, the management program 2410 shows the details of the selected configuration plan. In this example, configuration plan #4 is selected. The GUI showing details is described herein below (FIG. 19). If the "Cancel" button 2410-B30 is clicked, the management program 2410 cancels the process.

FIG. 19 shows a plan detail GUI 2410-C of the management program 2410. Field 2410-C10 shows a selected part of the original configuration in storage array. Field 2410-C20 shows a created configuration plan of server HW based storage array. This example shows that thin provisioning pool 01 of storage array 01 can be restructured on four server HW based storage arrays (11, 12, 13, and 14). This is a concrete instance of the "n+1" pattern 242E of the configuration pattern table 2420. Field 2410-C30 shows the estimated resource usage efficiency, estimated performance, and estimated cost of this configuration plan.

If the "Show next plan" button 2410-C40 is clicked, the management program 2410 shows the details of the next configuration plan. If the "Back to list" button 2410-050 is clicked, the management program 2410 shows the GUI 2410-B again. If the "Configure" button 2410-C60 is clicked, the management program 2410 configures server HW based storage arrays according to the created plan. If the "Cancel" button 2410-C70 is clicked, the management program 2410 cancels the process.

In this embodiment, the management program creates plans for restructuring configurations of storage array onto server HW based storage arrays by using configuration patterns. It also estimates resource usage efficiency, performance, and cost of each configuration plan created. By doing this, configurations of storage array can be easily restructured on server HW based storage arrays.

Of course, the system configuration illustrated in FIG. 1 is purely exemplary of information systems in which the present invention may be implemented, and the invention is not limited to a particular hardware configuration. The computers and storage systems implementing the invention can also have known IO devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed andor encrypted format.

From the foregoing, it will be apparent that the invention provides methods, apparatuses and programs stored on computer readable media for configuring IT infrastructure. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A management server coupled to at least one first storage array which is configured to execute a given function and coupled to a plurality of second storage arrays, the management server comprising:

a memory configured to store information of hardware configurations of the plurality of second storage arrays and to store information of one or more configuration patterns which realize the given function using a plurality of storage arrays, the plurality of storage arrays including the at least one first storage array and one or more second storage arrays; and a processor, in response to receipt of a request to create a configuration for the given function on the one or more second storage arrays, configured to select at least one configuration pattern, of the one or more configuration patterns, which can be realized by the hardware configurations of the one or more second storage arrays, wherein the one or more configuration patterns include a cache partition pattern of an n+1 type having one or more sets, each set having one representative node and one or more other nodes, the representative node having one or more cache partitions and the one or more other nodes having storage volumes using the one or more cache partitions, the storage volumes being virtualized to the representative node; and wherein the representative node has a cache capacity larger than a cache capacity of the one or more cache partitions in an original configuration, and, for each of the storage volumes, a capacity of a respective other node is larger than a capacity of a respective storage volume, the at least one first storage array being restructured onto the one or more second storage arrays in the original configuration.

2. The management server according to claim 1, wherein the processor is further configured to:

create a configuration plan for each of the at least one selected configuration pattern, to produce at least one configuration plan;

estimate resource usage efficiency, performance, and cost of each of the at least one configuration plan; and choose a recommended configuration plan which has a lowest cost among the at least one configuration plan and which has a performance greater than a preset required performance.

3. The management server according to claim 1, wherein the processor is further configured to:

create a configuration plan for each of the at least one selected configuration pattern, to produce at least one configuration plan;

estimate resource usage efficiency, performance, and cost of each of the at least one configuration plan; and display a list of the at least one configuration plan, a selectable button to select a configuration plan from the list, and a show details button to show details of the selected configuration plan.

4. The management server according to claim 1, wherein the plurality of second storage arrays are server HW (hardware) based storage arrays.

5. A management server coupled to at least one first storage array which is configured to execute a given function and coupled to a plurality of second storage arrays, the management server comprising:

a memory configured to store information of hardware configurations of the plurality of second storage arrays and to store information of one or more configuration patterns which realize the given function using a plurality of storage arrays, the plurality of storage arrays including the at least one first storage array and one or more second storage arrays; and a processor, in response to receipt of a request to create a configuration for the given function on the one or more second storage arrays, configured to select at least one configuration pattern, of the one or more configuration patterns, which can be realized by the hardware configurations of the one or more second storage arrays, wherein the one or more configuration patterns include a thin provisioning pattern of an n+1 type having a representative node and other nodes, the representative node having a thin provisioning pool and all volumes curved from the thin provisioning pool and the other nodes having pool elements, the pool elements being virtualized to the representative node; and wherein for each type of the pool elements, a total capacity of the other nodes is larger than a total capacity of the type of the pool elements.

6. The management server according to claim 5, wherein the processor is further configured to:

create a configuration plan for each of the at least one selected configuration pattern, to produce at least one configuration plan;

estimate resource usage efficiency, performance, and cost of each of the at least one configuration plan; and choose a recommended configuration plan which has a lowest cost among the at least one configuration plan and which has a performance greater than a preset required performance.

7. The management server according to claim 5, wherein the processor is further configured to:

create a configuration plan for each of the at least one selected configuration pattern, to produce at least one configuration plan;

estimate resource usage efficiency, performance, and cost of each of the at least one configuration plan; and display a list of the at least one configuration plan, a selectable button to select a configuration plan from the list, and a show details button to show details of the selected configuration plan.

8. The management server according to claim 5, wherein the plurality of second storage arrays are server HW (hardware) based storage arrays.

9. A management server coupled to at least one first storage array which is configured to execute a given function and coupled to a plurality of second storage arrays, the management server comprising:

a memory configured to store information of hardware configurations of the plurality of second storage arrays and to store information of one or more configuration patterns which realize the given function using a plurality of storage arrays, the plurality of storage arrays including the at least one first storage array and one or more second storage arrays; and a processor, in response to receipt of a request to create a configuration for the given function on the one or more second storage arrays, configured to select at least one configuration pattern, of the one or more configuration patterns, which can be realized by the hardware configurations of the one or more second storage arrays, wherein the one or more configuration patterns include a snapshot pattern of an n+1 type having a representative node and other nodes, the representative node having a snapshot pool and snapshot volumes and the other nodes having storage volumes and pool elements; and wherein, for each of the storage volumes, one of the other nodes has a capacity larger than a capacity of a respective storage volume, and a total capacity of the remaining other nodes is larger than a total capacity of all the pool elements.

10. The management server according to claim 9, wherein the processor is further configured to:
create a configuration plan for each of the at least one selected configuration pattern, to produce at least one configuration plan;
estimate resource usage efficiency, performance, and cost of each of the at least one configuration plan; and
choose a recommended configuration plan which has a lowest cost among the at least one configuration plan and which has a performance greater than a preset required performance.

11. The management server according to claim 9, wherein the processor is further configured to:
create a configuration plan for each of the at least one selected configuration pattern, to produce at least one configuration plan;
estimate resource usage efficiency, performance, and cost of each of the at least one configuration plan; and
display a list of the at least one configuration plan, a selectable button to select a configuration plan from the list, and a show details button to show details of the selected configuration plan.

12. The management server according to claim 9, wherein the plurality of second storage arrays are server HW (hardware) based storage arrays.

13. A management server coupled to at least one first storage array which is configured to execute a given function and coupled to a plurality of second storage arrays, the management server comprising:
a memory configured to store information of hardware configurations of the plurality of second storage arrays and to store information of one or more configuration patterns which realize the given function using a plurality of storage arrays, the plurality of storage arrays including the at least one first storage array and one or more second storage arrays; and
a processor, in response to receipt of a request to create a configuration for the given function on the one or more second storage arrays, configured to select at least one configuration pattern, of the one or more configuration patterns, which can be realized by the hardware configurations of the one or more second storage arrays,
wherein the one or more configuration patterns include a snapshot pattern of an n type, a snapshot pool is divided into a plurality of divided pools for each of a plurality of storage volumes using an original pool on the at least one first storage array which is restructured onto the one or more second storage arrays, and one node has a respective divided pool, a respective volume, snapshot volumes of the respective volume, and pool elements; and
wherein a total capacity of all nodes is larger than a total capacity of all the pool elements.

14. The management server according to claim 13, wherein the processor is further configured to:
create a configuration plan for each of the at least one selected configuration pattern, to produce at least one configuration plan;
estimate resource usage efficiency, performance, and cost of each of the at least one configuration plan; and
choose a recommended configuration plan which has a lowest cost among the at least one configuration plan and which has a performance greater than a preset required performance.

15. The management server according to claim 13, wherein the processor is further configured to:
create a configuration plan for each of the at least one selected configuration pattern, to produce at least one configuration plan;
estimate resource usage efficiency, performance, and cost of each of the at least one configuration plan; and
display a list of the at least one configuration plan, a selectable button to select a configuration plan from the list, and a show details button to show details of the selected configuration plan.

16. The management server according to claim 13, wherein the plurality of second storage arrays are server HW (hardware) based storage arrays.

17. A management server coupled to at least one first storage array which is configured to execute a given function and coupled to a plurality of second storage arrays, the management server comprising:
a memory configured to store information of hardware configurations of the plurality of second storage arrays and to store information of one or more configuration patterns which realize the given function using a plurality of storage arrays, the plurality of storage arrays including the at least one first storage array and one or more second storage arrays; and
a processor, in response to receipt of a request to create a configuration for the given function on the one or more second storage arrays, configured to select at least one configuration pattern, of the one or more configuration patterns, which can be realized by the hardware configurations of the one or more second storage arrays,
wherein the one or more configuration patterns include a remote replication pattern of an n+1 type having a representative source node and other source nodes on a source side, the representative source node having a source group and a source journal pool, the other source nodes having source volumes of the source group, the source volumes being virtualized to the representative source node;
wherein the representative source node has a capacity larger than a capacity of the source journal pool, and, for each of the source volumes, a respective source node has a capacity larger than a capacity of a respective source volume;
wherein the one or more configuration patterns include a target replication pattern of an n+1 type having a representative target node and other target nodes on a target side, the representative target node having a target group and a target journal pool, the other target nodes having target volumes of the target group, the target volumes being virtualized to the representative target node; and
wherein the representative target node has a capacity larger than a capacity of the target journal pool, and, for each of the target volumes, the target node has a capacity larger than a capacity of a respective target volume.

18. The management server according to claim 17, wherein the processor is further configured to:
create a configuration plan for each of the at least one selected configuration pattern, to produce at least one configuration plan;
estimate resource usage efficiency, performance, and cost of each of the at least one configuration plan; and choose a recommended configuration plan which has a lowest cost among the at least one configuration plan and which has a performance greater than a preset required performance.

19. The management server according to claim 17, wherein the processor is further configured to:
create a configuration plan for each of the at least one selected configuration pattern, to produce at least one configuration plan;
estimate resource usage efficiency, performance, and cost of each of the at least one configuration plan; and
display a list of the at least one configuration plan, a selectable button to select a configuration plan from the list, and a show details button to show details of the selected configuration plan.

20. The management server according to claim 17, wherein the plurality of second storage arrays are server HW (hardware) based storage arrays.

* * * * *